(12) United States Patent
Jin et al.

(10) Patent No.: US 12,286,579 B2
(45) Date of Patent: *Apr. 29, 2025

(54) FIRE-RETARDANT ORIENTED STRAND BOARD

(71) Applicant: ARXADA, LLC, Morristown, NJ (US)

(72) Inventors: Lehong Jin, Huntersville, NC (US); David Humphrey, Glen Iris (AU); Ghonche Rassam, New Plymouth (NZ); Olivera Zivkovic, Decatur, GA (US); Adegoke Adekunle, Loganville, GA (US); James Hurley, Sandy Springs, GA (US); Susan Thomason, Oxford, GA (US)

(73) Assignee: ARXADA, LLC, Morristown, NJ (US)

( * ) Notice: Subject to any disclaimer, the term of this patent is extended or adjusted under 35 U.S.C. 154(b) by 122 days.

This patent is subject to a terminal disclaimer.

(21) Appl. No.: 17/859,455

(22) Filed: Jul. 7, 2022

(65) Prior Publication Data

US 2022/0340816 A1  Oct. 27, 2022

Related U.S. Application Data

(63) Continuation of application No. 16/901,581, filed on Jun. 15, 2020, now Pat. No. 11,414,602.

(30) Foreign Application Priority Data

Feb. 28, 2020  (EP) .................................... 20160201

(51) Int. Cl.
*C09K 21/10*   (2006.01)
*B27K 3/02*   (2006.01)
(Continued)

(52) U.S. Cl.
CPC ............ *C09K 21/10* (2013.01); *B27K 3/0278* (2013.01); *B27K 3/08* (2013.01); *B27K 3/52* (2013.01);
(Continued)

(58) Field of Classification Search
None
See application file for complete search history.

(56) References Cited

U.S. PATENT DOCUMENTS 2,881,088 A   4/1959   Wilhelm
2,968,590 A   1/1961   Jean
(Continued)

FOREIGN PATENT DOCUMENTS

CA   1096104     2/1981
CA   2020118    12/1991
(Continued)

OTHER PUBLICATIONS

European Search Report for EP 2016 0201 dated Jun. 8, 2020, 5 pages.

*Primary Examiner* — Joseph D Anthony
(74) *Attorney, Agent, or Firm* — Dority & Manning, P.A.

(57) ABSTRACT

A two-part flame-retardant, a flame-retardant oriented strand (OSB) and method for forming a flame-retardant OSB is provided. The two-part flame-retardant composition includes an aqueous solution containing a water-soluble flame-retardant and a flame-retardant powder that is incorporated into an oriented strand board without substantially affecting the mechanical properties of the oriented strand board. The method includes applying the aqueous solution containing a water-soluble flame-retardant to an oriented strand board furnish and applying a flame-retardant powder to the wetted furnish, without requiring an additional drying step.

12 Claims, 3 Drawing Sheets

Related U.S. Application Data

(60) Provisional application No. 62/927,273, filed on Oct. 29, 2019, provisional application No. 62/861,056, filed on Jun. 13, 2019.

(51) Int. Cl.
    *B27K 3/08* (2006.01)
    *B27K 3/52* (2006.01)
    *B27N 9/00* (2006.01)
    *C09D 5/18* (2006.01)
    *C09D 15/00* (2006.01)
    *C09K 21/12* (2006.01)

(52) U.S. Cl.
    CPC ............... *B27N 9/00* (2013.01); *C09D 5/18* (2013.01); *C09D 15/00* (2013.01); *C09K 21/12* (2013.01); *B27K 2240/30* (2013.01)

(56) References Cited

U.S. PATENT DOCUMENTS

| | | | |
|---|---|---|---|
| 3,378,381 A | 4/1968 | Draganov | |
| 3,874,990 A | 4/1975 | Surdyk | |
| 4,008,214 A | 2/1977 | Sobolev et al. | |
| 4,461,721 A * | 7/1984 | Goettsche | A01N 59/14 |
| | | | 252/607 |
| 5,968,669 A | 10/1999 | Liu et al. | |
| 6,042,639 A | 3/2000 | Valso et al. | |
| 6,273,928 B1 | 8/2001 | Hayati et al. | |
| 6,306,317 B1 | 10/2001 | Richards et al. | |
| 6,423,251 B1 | 7/2002 | Blount | |
| 7,138,443 B2 | 11/2006 | Kasowski et al. | |
| 8,084,523 B2 | 12/2011 | Lopez et al. | |
| 8,642,184 B2 | 2/2014 | Wiehn et al. | |
| 9,669,564 B2 * | 6/2017 | Zhang | B27K 3/166 |
| 10,150,142 B2 | 12/2018 | Grunlan et al. | |
| 10,500,756 B2 | 12/2019 | Zhang et al. | |
| 11,414,602 B2 * | 8/2022 | Jin | B27K 3/0278 |
| 2002/0158237 A1 | 10/2002 | Blount | |
| 2005/0037202 A1 * | 2/2005 | Hejna | B27N 1/00 |
| | | | 428/524 |
| 2005/0229814 A1 | 10/2005 | Muvundamina | |
| 2006/0086283 A1 * | 4/2006 | Ray | B27K 3/16 |
| | | | 427/393 |
| 2006/0175587 A1 | 8/2006 | Kasowski | |
| 2006/0257578 A1 | 11/2006 | Zhang et al. | |
| 2007/0095760 A1 | 5/2007 | Girvan et al. | |
| 2008/0305351 A1 | 12/2008 | Schubert | |
| 2010/0280154 A1 * | 11/2010 | Thompson, Jr. | C09K 21/14 |
| | | | 524/14 |
| 2011/0073331 A1 | 3/2011 | Xu | |
| 2012/0251817 A1 | 10/2012 | Wiehn et al. | |
| 2013/0300015 A1 | 11/2013 | Baroux | |
| 2015/0010768 A1 * | 1/2015 | Murray | C09D 15/00 |
| | | | 428/541 |
| 2015/0352744 A1 | 12/2015 | Zhang et al. | |
| 2016/0257801 A1 | 9/2016 | Wiklund et al. | |
| 2017/0120473 A1 * | 5/2017 | Zhang | C09D 5/185 |
| 2019/0330531 A1 | 10/2019 | Wiehn et al. | |

FOREIGN PATENT DOCUMENTS

| | | | |
|---|---|---|---|
| CN | 1599772 | 3/2005 | |
| CN | 101121274 | 2/2008 | |
| CN | 107379141 | 11/2017 | |
| CN | 108247808 | 7/2018 | |
| EP | 0802027 | 10/1997 | |
| EP | 2505326 A1 * | 10/2012 | ............... B27N 9/00 |
| WO | WO9100327 | 1/1991 | |
| WO | WO2017220410 | 12/2017 | |
| WO | WO2018122406 | 7/2018 | |
| WO | WO2019231863 | 12/2019 | |

\* cited by examiner

FIRE-RETARDANT ORIENTED STRAND BOARD

RELATED APPLICATIONS

The present application is continuation of U.S. patent application Ser. No. 16/901,581 having a filing date of Jun. 15, 2020, which claims priority to U.S. Provisional Patent Application No. 62/861,056 having a filing date of Jun. 13, 2019, U.S. Provisional Patent Application No. 62/927,273 having a filing date of Oct. 29, 2019, and European Patent Application No. 20 160 201.8 having a filing date of Feb. 28, 2020, which are incorporated herein by reference.

BACKGROUND

Oriented strand board, or OSB, is an engineered wood that has been popular in many industries due to its low cost and good mechanical properties. OSB exhibits excellent strength and durability properties, making it highly desirable for load-bearing applications. OSB can be manufactured by a similar method to particle board, such as, by adding adhesives and wax to wood strands or flakes, and then compressing the mixture in specific orientations, making the OSB easy to produce.

However, while OSB is valued for its low cost and good mechanical properties, OSB is inherently flammable, limiting the applications for which it may be used. For example, when tested according to ASTM E84, untreated OSB exhibits a Flame Spread Rating of around 150, placing untreated OSB into Class III for flammability. As such, OSB is generally unable to be used in applications that specify low flammability materials, such as wall, floor, and roof sheathing.

Due to OSB's inherent flammability, many efforts have been made to impart flame-retardance/resistance into the OSB. However, due to the process of making OSB, and the need for adhesives and waxes, the attempts have been unsuccessful. Particularly, early attempts tried to incorporate flame-retardant compounds in powdered form into the mixture, either prior to, or during, the introduction of the wax and/or adhesive to the strands. However, it was quickly found that if enough powdered flame-retardant compounds were introduced into the mixture to impact flammability, the mechanical properties of the OSB were negatively affected. Furthermore, the application of flame-retardant compounds in powdered form brings problems with their uneven distribution in the wooden composite, due to insufficient homogenization between wooden particles in the mixing drum, as well as settling of powders added to strands and dusting problems negatively affecting the machinery and OSB mechanical and fire-retardance properties.

There were also attempts to impart flame-retardance/resistance to OSB by using aqueous solutions containing flame-retardant compounds. However, known flame-retardant compounds were generally insoluble or sparingly soluble in aqueous solutions. This necessitated large amounts of solvent to be applied along with any aqueous solutions, requiring the OSB strands to be dried for a second time after application of the flame-retardant compounds. This caused many problems in the OSB industry, as the existing processing capabilities were not equipped for a second drying step after incorporation of the wax and/or adhesive. Furthermore, it was found that many of the water-soluble flame-retardant compounds, such as ammonium phosphate, degraded the wood over time, particularly at elevated temperatures.

Moreover, attempts were made to introduce flame-retardant compounds as an organic or non-aqueous based solution. However, this greatly increased the volatile content of the solution, creating further problems in managing the volatile organic content exposure during production, and amounts of the organic or non-aqueous solutions remaining in the product. Therefore, the soluble, or sparingly soluble, flame-retardant compounds were also found to be insufficient for imparting flame resistance into the OSB.

Therefore, it would be beneficial to provide a flame-retardant oriented strand board that overcomes one or more of the above discussed problems. For instance, it would be beneficial to provide a flame-retardant oriented strand board that maintains good mechanical properties while having sufficient flame-retardance/resistance.

SUMMARY

In one aspect, the present disclosure is directed to a flame-retardant oriented strand board, where the oriented strand board has at least one inner layer and at least one outer layer. The oriented strand board contains a two-part flame-retardant that includes a water-soluble flame-retardant having a solubility in water of at least about 400 g/L, and a flame-retardant in the form of a powder (flame-retardant powder).

In a further aspect, the at least one inner layer contains the water-soluble flame-retardant. Additionally or alternatively, in one aspect, the at least one outer layer contains at least one of the water-soluble flame-retardant or the flame-retardant powder. Moreover, in one aspect, the at least one outer layer contains both the water-soluble flame-retardant and the flame-retardant powder. Furthermore, in one aspect, the at least one outer layer contains a greater total amount of two-part flame-retardant than the at least one inner layer. In another aspect, the oriented strand board contains about 20% or less of the two-part flame-retardant. In one aspect, the oriented strand board has an internal bond strength of about 50 psi or greater.

Nonetheless, in one aspect, the present disclosure is directed to a two-part flame-retardant for oriented strand board. The two-part flame-retardant includes a water-soluble flame-retardant having a solubility in water of at least about 400 g/L, and a flame-retardant.

In one aspect, the water-soluble flame-retardant includes a borate, a borate ester, a borate alkanolamine, an amine phosphoric acid salt, a dicyandiamide and formaldehyde phosphoric acid salt resin, or combinations thereof. In a further aspect, the water-soluble flame retardant includes a boric acid and aminoethanol adduct, a polyethylene amine phosphoric acid salt, polydicyandiamide, or combinations thereof. In yet another aspect, the water-soluble flame retardant is a 2-aminoethanol and boric acid adduct, the polyethylene amine phosphoric acid salt is a reaction product of tetraethylenepentamine (TEPA), pentaethylenehexamine (PEHA), hexaethyleneheptamine (HEHA), and higher molecular weight polyethylene amines such as Polyamine B, or mixtures thereof, with phosphoric acid, or combinations thereof.

In a further aspect, the water-soluble flame-retardant is selected from a reaction product of tetraethylenepentamine (TEPA), pentaethylenehexamine (PEHA), hexaethyleneheptamine (HEHA), higher molecular weight polyethylene amine product such as Polyamine B, or mixtures thereof, with phosphoric acid.

Furthermore, in an aspect, the flame-retardant powder has a median particle size (d50) of from about 1 μm to about 1000 µm. Moreover, in one aspect, the flame-retardant powder includes a boric acid, borax, disodium octaborate tetrahydrate (DOT), guanylurea phosphate (GUP), an ammonium polyphosphate (APP), or combinations thereof. In one aspect, the flame-retardant powder includes a 1:1 blend of boric acid and borax, and/or a 1:1 blend of boric acid and disodium octaborate tetrahydrate (DOT). In one aspect, the flame-retardant powder includes ammonium polyphosphate (APP). Furthermore, in an aspect, the ammonium polyphosphate (APP) is ammonium polyphosphate phase 2.

The present disclosure is also generally directed to a method of forming a flame-retardant oriented strand board. The method includes applying an aqueous solution containing a water-soluble flame-retardant present in the aqueous solution in an amount of about 40% by weight or greater to a first furnish, and applying a flame-retardant powder to the first furnish, where the first furnish is configured to form an oriented strand board without an additional drying step.

Additionally or alternatively, in one aspect, the method includes applying the water-soluble flame-retardant to a second furnish, where the first furnish forms at least one outer layer and the second furnish forms at least one inner layer. Moreover, in an aspect, the second furnish only contains the water-soluble flame-retardant. In a further aspect, at least one of the first furnish and the second furnish is formed into a mat and pressed. In one aspect, a mat is formed from the second furnish, and is disposed between at least two mats formed from the first furnish. In yet another aspect, the second furnish is a portion of the first furnish that is separated from the first furnish after applying the aqueous solution but prior to applying the flame-retardant powder.

Furthermore, the present disclosure is also generally directed to a kit that includes a two-part flame-retardant as discussed above. The water-soluble flame-retardant is in the form of an aqueous solution comprising at least about 40 wt. % of the water-soluble flame retardant dissolved therein; and wherein the flame-retardant powder is in the form of a solid and has a median particle size (d50) of from about 1 µm to about 1000 µm.

Other features and aspects of the present disclosure are discussed in greater detail below.

BRIEF DESCRIPTION OF THE DRAWINGS

The foregoing and other features and aspects of the present disclosure and the manner of attaining them will become more apparent, and the disclosure itself will be better understood by reference to the following description, appended claims and accompanying drawings, where:

DEFINITIONS

Figure 1:
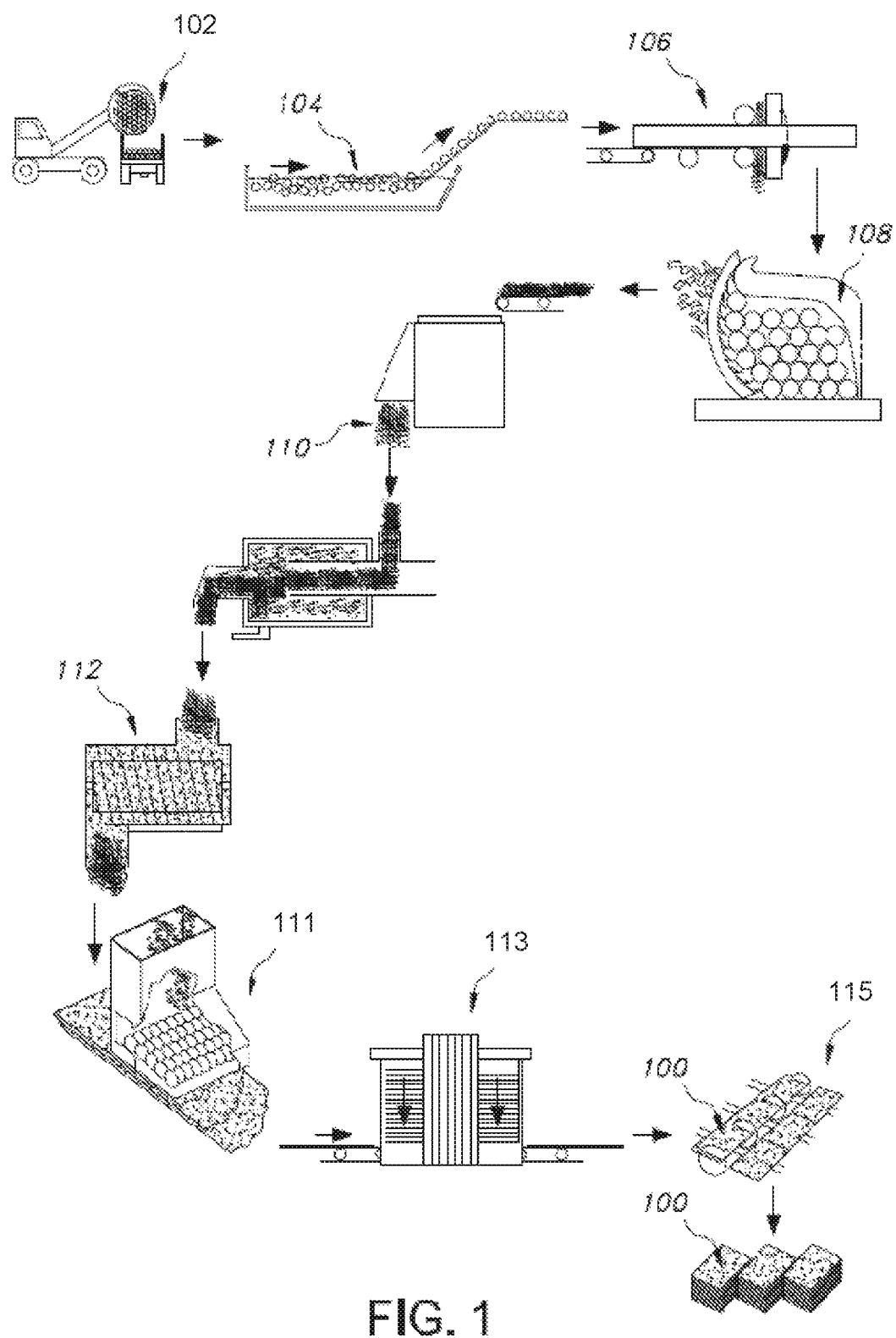
FIG. 1 provides a view of a method of forming an oriented strand board.

As used herein, percentages are weight percentages (wt. %) unless otherwise stated.

As used herein, the terms "about," "approximately," or "generally," when used to modify a value, indicate that the value can be raised or lowered by 5% and remain within the disclosed embodiment.

As used herein, the terms "flame" and "fire" (e.g. as used in regards to flame-retardant and fire-retardant) can be used interchangeably.

As used herein, the terms "flame-retardant" and "flame-resistant" can be used interchangeably, and refer to a material that has flame-retardant and -resistant properties, or that has been treated to have flame-retardant and -resistant properties.

As used herein, "flame-retardant powder" may also be termed "micronized flame-retardant".

As used herein, the terms "surface layer" and "face layer" can be used interchangeably.

As the person of skill in the art will appreciate, 1 pound per square inch (psi) corresponds to 68.947 millibar (mbar). Accordingly, 50 psi corresponds to 3447.379 mbar, for example.

DETAILED DESCRIPTION

It is to be understood by one of ordinary skill in the art that the present discussion is a description of exemplary embodiments only, and is not intended as limiting the broader aspects of the present disclosure.

The present inventors surprisingly found a highly effective two-part flame-retardant for oriented strand boards that does not negatively affect the mechanical properties of the oriented strand board, and that does not necessitate any additional drying after incorporation of the two-part flame-retardant.

Flame-Retardant Compounds and Composition for Oriented Strand Board

Herein provided is a two-part flame-retardant for oriented strand board comprising a water-soluble flame-retardant having a solubility in water of at least about 400 g/L; and a flame-retardant powder.

Water-Soluble Flame-Retardant

The water-soluble flame-retardant has a solubility in water (or an aqueous solution) of at least about 400 grams per liter (g/L), or at least about 450 g/L, or at least about 500 g/L, or at least about 550 g/L or at least about 600 g/L, or at least about 650 g/L, or at least about 700 g/L, or at least about 750 g/L, or at least about 800 g/L, or any ranges or values there between.

In some embodiments, the water-soluble flame-retardant is in the form of a solution, preferably an aqueous solution or a concentrated aqueous solution.

The solvent for the water-soluble flame-retardant may be an aqueous solvent, preferably the solvent is water. However, notwithstanding the aqueous solvent, in a further embodiment, an amount of a second solvent, which may be an organic solvent, an anionic solvent, a nonionic solvent, or other solvent used in the art, may be used in addition to the aqueous solvent. Generally, the second solvent may be used in an amount of about 10 wt. % or less, such as about 5 wt. % or less, based upon the total weight of the solvents. In some embodiments, no organic solvents are used. This minimizes the volatile organic content of the solvent and flame-retardant composition. In some embodiments, only the aqueous solvent is used.

The water-soluble flame-retardant may be comprised in the two-part flame-retardant of the invention in an amount of at least about 40 wt. %, at least about 45 wt. %, at least about 50 wt. %, at least about 55 wt. %, at least about 60 wt. %, at least about 65 wt. %, at least about 70 wt. %, at least about 75 wt. %, or at least about 80 wt. %. In some embodiments, the water-soluble flame-retardant may be comprised in the two-part flame-retardant of the invention in an amount of about 40 wt. % to about 98 wt. %, or from about 42 wt. % to about 95 wt. %. It should be understood that the above referenced percentages refer to an amount of the water-soluble flame-retardant in their solid form that have been dissolved in the solution.

The water-soluble flame-retardant comprised in the two-part flame-retardant of the invention may be at least one of
- a borate,
- a borate ester,
- a borate alkanolamine, preferably a boric acid and aminoethanol adduct, more preferably a 2-aminoethanol and boric acid adduct, most preferably a 2:1 wt. % adduct of 2-aminoethanol and boric acid,
- an amine phosphoric acid salt, preferably a polyamine phosphoric acid salt, more preferably a polyethylene amine phosphoric acid salt, or
- a dicyandiamide-formaldehyde phosphoric acid salt.

In one embodiment, the water-soluble flame-retardant is selected from the group comprising
- a borate,
- a borate ester,
- a borate alkanolamine, preferably a boric acid and aminoethanol adduct, more preferably a 2-aminoethanol and boric acid adduct, most preferably a 2:1 wt. % adduct of 2-aminoethanol and boric acid,
- an amine phosphoric acid salt, preferably a polyamine phosphoric acid salt, more preferably a polyethylene amine phosphoric acid salt, or
- a dicyandiamide-formaldehyde phosphoric acid salt, or combinations thereof.

In one embodiment, the water-soluble flame-retardant is selected from the group consisting of a borate,
- a borate ester,
- a borate alkanolamine, preferably a boric acid and aminoethanol adduct, more preferably a 2-aminoethanol and boric acid adduct, most preferably a 2:1 wt. % adduct of 2-aminoethanol and boric acid,
- an amine phosphoric acid salt, preferably a polyamine phosphoric acid salt,
  more preferably a higher polyethylene amine phosphoric acid salt,
- a dicyandiamide-formaldehyde phosphoric acid salt, and combinations thereof.

The borate alkanolamine is preferably a borate alkanolamine adduct, preferably a 2-aminoethanol and boric acid adduct, more preferably a 2:1 wt. % adduct of 2-aminoethanol and boric acid.

The amine phosphoric acid salt may be an inorganic phosphate salt formed from ammonia, ammonium compounds, or amides and phosphoric acid. For example, the amine phosphoric acid salt is formed from amines that include primary, secondary or tertiary amines, diamines, triamines, polyamines, polyethylene amines or combinations thereof.

Polyamines generally refer to polymers having in the chain aminic repeating units R—NH—R or R—NR—R. Polyethylene amines (also called polyalkylpolyamines or ethyleneamines) are linear, short-chain polyethyleneimines with a high proportion of primary amino groups with the general formula $H_2[NCH_2—CH_2—NH]_nH$ (with n=2/diethylenetriamine (DETA); n=3/triethylenetetramine (TETA); n=4/tetraethylenepentamine (TEPA), n=5/pentaethylenehexamine (PEHA), n=6/hexaethyleneheptamine (HEHA)).

Ethyleneamines are defined here as polymeric forms of ethylene diamine with three or more nitrogen atoms and including piperazine and its analogues. A thorough review of ethylene diamine and ethyleneamines can be found in the Encyclopedia of Chemical Technology, Vol 8, pgs. 74-108. Ethyleneamines encompass a wide range of multifunctional, multireactive compounds. The molecular structure can be linear, branched, cyclic, or combinations of these. Examples of commercial ethyleneamines are diethylenetriamine (DETA), piperazine (PIP), triethylenetetramine (TETA), tetraethylenepentamine (TEPA), pentaethylenehexamine (PEHA), aminoethylpiperazine (AEP), and aminoethylethanolamine (AEEA). Other compounds which may be applicable are 1,2-propylenediamine, 1,3-diaminopropane, N-(3-aminopropyl)-1,3-propanediamine, N-(2-aminoethyl)-1,3-propylenediamine, N,N'-Bis-(3-aminopropyl)-ethylenediamine, dimethylaminopropylamine, and triethylenediamine.

Suitable polyamines or polyethylene amines include but are not limited to ethlyenediamine, diethylenetriamine (DETA), triethylenetetraamine (TETA), tetraethylenepentamine (TEPA), pentaethylenehexamine (PEHA), hexaethyleneheptaamine, (HEHA), and the like. Ethylene amines of this kind are referred to herein as "higher ethylene polyamines" or polyethylene amines. These higher polyethylene amines may exist as a blend or mixture of one or more polyamines.

In one embodiment, the water-soluble flame-retardant comprises a dicyandiamide formaldehyde phosphoric acid salt.

In one embodiment, the water-soluble flame-retardant is selected from the group comprising of a polyethylene amine phosphoric acid salt, a boric acid and aminoethanol adduct, and combinations thereof.

In one embodiment, the water-soluble flame-retardant comprises a polyethylene amine phosphoric acid salt, a boric acid and aminoethanol adduct or combinations thereof.

In one embodiment, the water-soluble flame-retardant comprises a polyethylene amine phosphoric acid salt.

In one embodiment the water-soluble flame-retardant is selected from the group comprising of a boric acid and aminoethanol adduct, a polyethylene amine phosphoric acid salt, and combinations thereof.

In one embodiment the water-soluble flame-retardant is a polyethylene amine phosphoric acid salt.

Preferably, the boric acid and aminoethanol adduct is a 2:1 wt. % adduct of 2-aminoethanol and boric acid.

Preferably, the polyethylene amine phosphoric acid salt is a reaction product of tetraethylenepentamine (TEPA), pentaethylenehexamine (PEHA), hexaethyleneheptamine (HEHA), and higher molecular weight polyethylene amine product such as Polyamine B, or mixtures thereof, with phosphoric acid.

Polyethylene amine products are known to the skilled in the art, and are commercially available such as Polyamine B (a product by Akzo Nobel, CAS 68131-73-7).

The present inventors have surprisingly found that the above water-soluble flame-retardants are especially suitable for forming concentrated aqueous solutions, and surprisingly, exhibit little to no thermal degradation of the OSB, contrary to the shortcomings described above in regards to lower molecular weight ammonium phosphates used in two-part flame-retardants of the prior art.

Flame-Retardant Powder

The flame-retardant powder may have a size on the micrometer scale, e.g. a powder that has been mechanically altered to have particles with a median size (d50) of from about 1 μm to about 1000 μm, such as from about 2 μm to about 850 μm, such as from about 3 μm to about 100 μm, such as from about 20 μm to about 80 μm or any values or ranges there between as are known in the art.

Of course, as may be known in the art, "micronized powder" may also refer to smaller particle sizes, and thus, may include a portion of the particles having a size of less than 1 µm. Particularly, the present disclosure has found that such a fine particle size allows for an even, uniform coating of the strands or flakes. Furthermore, the remaining solvent from the water-soluble two-part flame-retardant may allow the fine particles to adhere to the furnish, thus preventing the powder from settling to the bottom of the blender or dusting out of the blender.

The solubility of the flame-retardant powder in water or aqueous solutions is generally lower than that of the water-soluble flame-retardant comprised in the two part flame-retardant of the invention. For example, the flame-retardant powder has a solubility in water (or an aqueous solution) of less than about 400 grams per liter (g/L), or less than about 300 g/L, or less than about 250 g/L, or less than about 200 g/L, or less than about 150 g/L, or less than about 100 g/L.

Additionally or alternatively, and notwithstanding the size of the powder, the flame-retardant powder may be at least one of
a boric acid,
a borate, such as borax, or disodium octaborate tetrahydrate (DOT),
a phosphorous-nitrogen based powder, for example an amine-phosphate flame-retardant or a polyamine-phosphate flame-retardant,
ammonium polyphosphate,
guanidine phosphate,
an adduct of a phosphoric acid and guanidine derivative such as guanylurea phosphate (GUP),
a silicate, or
combinations, derivatives, or adducts thereof.

In one embodiment, the flame-retardant powder may be selected from the group comprising
a boric acid,
a borate, such as borax, or disodium octaborate tetrahydrate (DOT),
a phosphorous-nitrogen based powder, for example an amine-phosphate flame-retardant or a polyamine-phosphate flame-retardant, ammonium polyphosphate (APP),
guanidine phosphate,
an adduct of a phosphoric acid and guanidine derivative such as guanylurea phosphate (GUP),
a silicate, or
combinations, derivatives, or adducts thereof.

In one embodiment, the flame-retardant powder may be selected from the group consisting of
a boric acid,
a borate, such as borax, or disodium octaborate tetrahydrate (DOT),
a phosphorous-nitrogen based powder, for example an amine-phosphate flame-retardant or a polyamine-phosphate flame-retardant,
ammonium polyphosphate (APP),
guanidine phosphate,
an adduct of a phosphoric acid and guanidine derivative such as guanylurea phosphate (GUP),
a silicate, and
combinations, derivatives, or adducts thereof.

In one embodiment, the flame-retardant powder comprises at least one of an ammonium polyphosphate (APP), or an guanylurea phosphate.

In one embodiment, the flame-retardant powder comprises ammonium polyphosphate (APP).

Borates suitable as flame-retardant powder are known to the skilled artisan, for example sodium borate (borax), zinc borates, ammonium fluoroborate [13826-83-0], or barium metaborate.

Ammonium polyphosphates (APP) are known to the skilled in the art, see e.g., ammonium polyphosphate phase 2 (CAS: 68333-79-9).

In one embodiment, the flame-retardant powder comprises at least one of
a boric acid,
a borate, preferably borax or disodium octaborate tetrahydrate (DOT),
an amine-phosphate flame-retardant,
an adduct of a phosphoric acid and guanidine derivative,
a ammonium polyphosphate (APP),
a silicate, or
combinations thereof.

In one embodiment, the flame-retardant powder is selected from the group comprising
a boric acid,
borax,
disodium octaborate tetrahydrate (DOT),
guanylurea phosphate (GUP),
ammonium polyphosphate (APP), or
combinations thereof.

In one embodiment, the flame-retardant powder is selected from the group consisting of
a boric acid,
borax,
disodium octaborate tetrahydrate (DOT),
guanylurea phosphate (GUP),
ammonium polyphosphate (APP), and
combinations thereof.

In one embodiment, the flame-retardant powder comprises
a 1:1 blend of boric acid and borax,
a 1:1 blend of boric acid and disodium octaborate tetrahydrate (DOT),
guanylurea phosphate (GUP),
ammonium polyphosphate (APP), or
combinations thereof.

In another embodiment, the flame-retardant powder is selected from the group consisting of
a 1:1 blend of boric acid and borax,
a 1:1 blend of boric acid and disodium octaborate tetrahydrate (DOT),
guanylurea phosphate (GUP),
ammonium polyphosphate (APP), and
combinations thereof.

In yet a further embodiment, the flame-retardant powder is selected from the group consisting of
guanylurea phosphate (GUP),
ammonium polyphosphate (APP), or
combinations thereof.

In one embodiment, the flame-retardant powder is ammonium polyphosphate (APP).

Preferably, the ammonium polyphosphate (APP) is ammonium polyphosphate phase 2 (CAS: 68333-79-9).

The flame-retardant powder may also include an anti-caking additive in conjunction with the flame-retardant powder compound. In some embodiments, the anti-caking additive is a silica, such as a fumed silica, however, other anti-caking additives may be used as are known in the art.

Particularly, the present disclosure has found that the flame-retardant powder can be mixed with the furnish that has been wetted with the water-soluble flame-retardant to yield an OSB with excellent flame-retardant properties without suffering from the above noted deficiencies in regards to powder flame-retardants.

The flame-retardant powder may be a "dry powder", meaning a powder comprising about 10 wt. % or less of liquid prior to mixing with the water-soluble flame-retardant. Alternatively, the flame-retardant powder may be mixed with the water-soluble flame-retardant as a dispersion of particles within the aqueous solution comprising the water-soluble flame-retardant.

The water-soluble flame-retardant and the flame-retardant powder according to the present invention work together synergistically to provide excellent flame-retardant properties to the OSB without requiring a large proportion of the OSB by weight to be occupied by flame-retardants.

The two parts of the two-part flame-retardant may be applied together or separately. Thus, the two parts of the two-part flame-retardant of the invention may be in the form of a kit comprising the water-soluble flame-retardant and the flame-retardant powder separately, wherein the water-soluble flame-retardant may be in the form of a solid, or in the form of a solution, preferably in the form of an aqueous solution, or concentrated aqueous solution, while the flame-retardant powder may be in the form of a solid, or in the form of an aqueous dispersion. Alternatively, the two-part flame-retardant composition of the invention may be in the form of a dispersion, wherein the flame-retardant powder is dispersed in the solution of the water-soluble flame-retardant.

In one embodiment, the water-soluble retardant and the flame-retardant powder forming the two-part flame-retardant of the invention are provided separately, wherein the water-soluble retardant is in the form of an aqueous solution comprising at least about 40 wt. % of the water-soluble flame-retardant dissolved therein; and wherein the flame-retardant powder is in the form of a solid and has a median particle size (d50) of from about 1 µm to about 1000 µm.

In one embodiment, the water-soluble retardant and the flame-retardant powder forming the two-part flame-retardant of the invention are provided in the form of an aqueous dispersion, comprising at least about 40 wt. % of the water-soluble flame-retardant dissolved therein; and comprising the flame-retardant powder in the form of a solid having a median particle size (d50) of from about 1 µm to about 1000 µm dispersed therein.

For example, previously it was found that a high loading of water-soluble flame-retardants (15%-20 wt. %) was insufficient to provide adequate flame-retardant properties to the OSB. Similarly, it was found that to impart sufficient flame-retardance to the OSB using flame-retardant powders, a high load of greater than 15%-20 wt. % of the flame-retardant powder was needed, which negatively impacted the mechanical properties of the OSB.

However, the present disclosure has unexpectedly found that, by using the two-part flame-retardant of the invention, a lower amount by weight of the OSB may be efficiently used, and additionally or alternatively, the combination of the water-soluble flame-retardant and flame-retardant powder lessen, or eliminate, the negative impact on the mechanical properties generally exhibited by fire-retardant treated OSB. Thus, the OSB still exhibits excellent fire-retardant properties even when a relatively low amount of flame-retardants are used, and, additionally or alternatively, negative effects on the mechanical properties of the OSB are lessened or eliminated when the blend of flame-retardants of the invention are utilized. Furthermore, without wishing to be bound by theory, it is believed that the lower amount of flame-retardant compounds, in combination with the low levels of aqueous solution that remain due to the water-soluble flame-retardant compound, minimize many of the dusting and incorporation problems discussed above in regards to the prior art powdered flame-retardant compositions.

Flame-Retardant Oriented Strand Board

The present disclosure is further directed to a flame-retardant oriented strand board that comprises of at least one inner layer and at least one outer layer. This oriented strand board comprises the two-part flame-retardant of the invention comprising a water-soluble flame-retardant having a solubility in water of at least about 400 g/L as defined above; and a flame-retardant powder as defined above.

The at least one inner layer will typically comprise the water-soluble flame-retardant, while the at least one outer layer will typically comprise at least one of the water-soluble flame-retardant and the flame-retardant powder.

In some embodiments, the at least one outer layer comprises a greater total amount of two-part flame-retardant than the at least one inner layer.

In some embodiments, the oriented strand board comprises about 20 wt. % or less of the two-part flame-retardant.

The present disclosure has found that an oriented strand board (OSB) may be formed so as to have low flame spread while maintaining its mechanical properties due to a unique two-part flame-retardant composition of the invention. In this manner, the present disclosure has unexpectedly found that the oriented strand board may contain less than about 30% by weight, or even less than about 20% by weight, two-part flame-retardant, thus minimizing the effect on the mechanical properties of the OSB, while imparting excellent flame retardance properties.

For instance, as may be known in the art, FIG. 1 generally refers to a method of producing an oriented strand board 100. As shown in FIG. 1, and for illustration only, logs 102 may be placed onto a belt 104 that will transfer the logs 102 for further processing. During processing, the logs 102 may be debarked 106, and put through a stranding machine 108, that separates the logs 102 into wood strands and flakes e.g. the wood furnish 110, which are then dried. After drying, the furnish 110 is blended with additives 112, such as adhesive(s) and wax(es), such that the furnish 110 can be pressed into the shape of an OSB. After blending 112, the furnish may be spread into a layer 111, pressed 113, and cut 115 to the desired size, forming an OSB 100.

Thus, as shown in FIG. 1, which illustrates a general process for forming an oriented strand board 100, it would be difficult and economically unfeasible to introduce additives prior to drying the furnish, or to modify the line to add an additional drying step after introduction of additives. Therefore, as the two-part flame-retardant and/or individual flame-retardants of the prior art are typically incorporated into the furnish during the additive step, which occurs after drying, it would be particularly beneficial to provide a two-part flame-retardant that does not require an additional drying step, and/or that does not negatively affect the processing line or mechanical properties of the OSB. This may be achieved with the two-part flame-retardant composition of the invention.

The water-soluble flame-retardant may be applied to the dried furnish 110 in the form of an aqueous solution. Due to the high aqueous solubility of the particular flame-retardant of the invention, it may be comprised in high concentrations in the aqueous solvent, unlike the aqueous solutions discussed in the prior art.

Therefore, the water-soluble flame-retardant of the invention may be applied to the furnish with a very low amount of solvent, so that about 15 wt. % of the furnish or less of the solvent is introduced to the furnish when the aqueous solution is applied, such as about 12 wt. % of the furnish or less, such as about 10 wt. % of the furnish or less, such as about 8 wt. % of the furnish or less, such as about 7 wt. % of the furnish or less, or such as about 1 wt. % of the furnish or greater, such as about 3 wt. % of the furnish or greater solvent introduced to the furnish when the aqueous solution is applied, or any values or ranges there between. Thus, the furnish 110 does not need to undergo a further drying step, as only a small volume of solvent is applied with the water-soluble flame-retardant.

Moreover, it has been unexpectedly found that a flame-retardant powder may be used in an amount of from about 20 wt. % or less of the furnish, such as from about 18 wt. % or less, such as from about 15 wt. % or less, such as from about 12 wt. % or less, such as from about 10 wt. % or less, such as from about 8 wt. % or less, such as from about 6 wt. % or less, or such as about 1 wt. % or greater, such as from about 3 wt. % or greater, by weight of the furnish, or any values or ranges there between, and exhibit excellent flame-retardant properties while still yielding an OSB with good mechanical properties.

For instance, in some embodiments, the flame-retardant oriented strand board of the invention comprises a total amount of both the water-soluble flame-retardant and the flame-retardant powder from about 2 to about 30 wt. %, such as from about 3 to about 25 wt. %, such as from 4 to 20 wt. %, such as from 5 to 18 wt. %, such as from 6 to 17 wt. %, such as from 7 to 16 wt. %, such as from 8 to 15.5 wt. %, or any values or ranges there between.

In one embodiment, the flame-retardant oriented strand board of the invention comprises about 20 wt. % or less of the two-part flame-retardant of the invention. For example, the flame-retardant oriented strand board of the invention comprise from about 2% to about 20 wt. %, such as from about 2.5% to about 18%, such as from about 3% to about 16%, such as from about 3.5% to about 15%, such as from about 4% to about 12%, such as from about 4.5% to about 9 wt. %, or any values or ranges there between of the two-part flame-retardant of the invention.

Additionally, or alternatively, additives as known in the OSB art may be incorporated into the furnish. Generally, any additive as known in the art may be used, such as adhesives, waxes, insect repellants, moisture resistant compounds, fungicides, biocides, and color dyes.

Particularly, in some embodiments, one or more adhesives are incorporated into the furnish 110. The adhesives, and other additives may be incorporated into the furnish either before, after, or along with, the two-part flame-retardant. The adhesive may be a formaldehyde adhesive, an isocyanate adhesive, a melamine or melamine urea adhesive, or combinations thereof. For example, the adhesive may be a polymeric methylene diisocyanate (PMDI), a urea formaldehyde, a melamine-urea-formaldehyde, a phenol formaldehyde, or combinations thereof. Of course one or more layer(s) of the OSB may include an adhesive that is different from another layer. For instance, an inner layer may contain a PMDI adhesive, where an outer layer contains a different adhesive. However, it is also contemplated that only a single adhesive is used regardless of the number of layers.

In a further embodiment, waxes are incorporated along with one or more parts of the two-part flame-retardant. For instance, a wax according to the present disclosure may be a wax emulsion used to control water absorbency and swelling, such as paraffin wax emulsions. Of course, other waxes and wax emulsions may be used as known in the art.

While layers and different compositions of layers have been described herein, the following disclosure of an OSB and a method of making an OSB according to the present disclosure may further describe an aspect or embodiment of the present disclosure that includes an OSB with more than one layer.

An OSB may generally have at least one inner layer and at least one outer layer. The inner layer or layers may also be referred to as the core layer, and the outer layer or layers may be referred to as the surface layer. For example, the OSB may have at least about one inner layer, such as at least about two inner layers, such as about three inner layers, such as about five inner layers or less, such as about four layers inner or less, or any range or value there between. Similarly, the OSB may have at least about one outer layer, such as at least about two outer layers, such as about three outer layers, such as about five outer layers or less, such as about four outer layers or less, or any range or value there between. In some embodiments, there is only one inner layer and one outer layer, and in alternative embodiments there is any combination of inner and outer layers as described above. It should be understood that the layers may be assembled or formed such that there is no visible distinction between the layers. Therefore, the inner and outer layers may also be in reference to an inner zone and an outer zone of a continuous OSB.

Figure 2A:
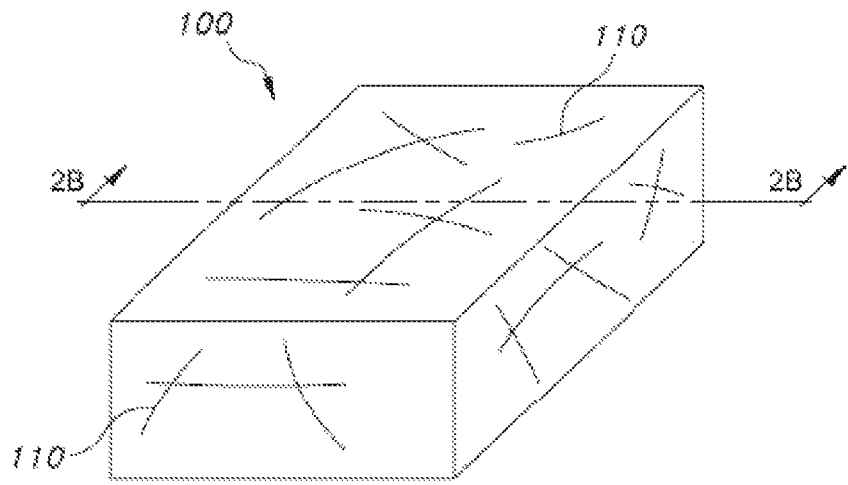
FIG. 2A illustrates an oriented strand board according to the present disclosure.
Figure 2B:
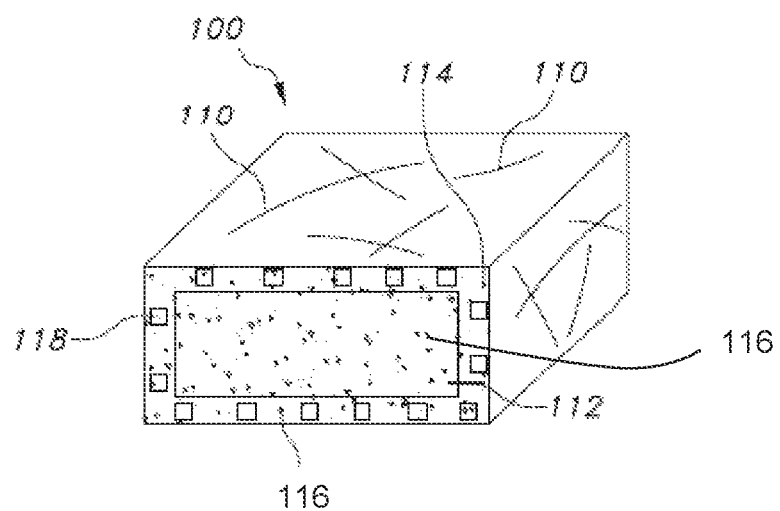
FIG. 2B illustrates a cross section of an oriented strand board according to FIG. 2A.

For instance, referring to FIGS. 2A and 2B, an OSB is generally shown in FIG. 2A, and a cross section of FIG. 2A is shown in FIG. 2B. As shown, an oriented strand board 100 may be formed from furnish 110 that has been placed in one or more layers to form a mat, and then pressed together to form the OSB. Therefore, the furnish 110 is oriented in one or more directions in the final product. As described above, the furnish 110 may be oriented in a variety of directions as are known in the art. Regardless, in some embodiments, the OSB may have one or more inner layers 112 and one or more outer layers 114. As described above, it should be understood that while FIG. 2B is shown as having one inner layer 112 and one outer layer 114, both the inner layer 112 and outer layer 114 may contain one or more layers and be inclusively referred to as the inner layer or core layer, and the outer layer may contain one or more layers and inclusively be referred to as the outer layer or surface layer. Thus, it should be understood that both or either of the inner layer and outer layer of FIG. 2B may contain one or more layers.

As shown in FIG. 2B, the inner layer or core layer 112 may contain one or more water-soluble flame-retardants 116. As shown in FIG. 2B, the one or more water-soluble flame-retardants 116 may be generally evenly dispersed throughout the one or more inner layers 112. Of course, it should be understood that the one or more water-soluble flame-retardants 116 may be dispersed in clumps, more localized to the exterior of the layer, or formed as a gradient increasing in concentration towards the exterior of the layer, depending upon the desired end product and use. In some embodiments, as shown in FIG. 2B, the one or more water-soluble flame-retardants may be dispersed in a substantially continuous and homogenous manner.

Regardless of the manner of dispersing the at least one water-soluble flame-retardant 116, as shown in FIG. 2B, in some embodiments, the inner layer 112 may contain little to no flame-retardant powder 118. For example, as shown in embodiment of FIG. 2B, the flame-retardant powder is only contained in the outer layer or layers 114. However, it should be understood that the inner layer may contain both the water-soluble flame-retardant 116 and the flame-retardant powder 118 depending on the desired end product.

Particularly, while the present disclosure has unexpectedly found that the combination of the water-soluble flame-retardant and flame-retardant powder work synergistically to provide an OSB with excellent flame-retardance while maintaining excellent mechanical properties in the OSB, the present disclosure has also found that the water-soluble flame-retardant may provide excellent protection to the core layer even without the flame-retardant powder, when used in conjunction with a surface layer according to the present disclosure. Therefore, it has been found that the mechanical properties of the OSB according to the present disclosure may be further improved, such as by using only a water-soluble flame-retardant in the core layer, in some embodiments, to improve the strength of the core, while maintaining excellent flame-retardant properties by using a surface layer formed according to the present disclosure to synergistically yield excellent mechanical properties.

Figure 3:
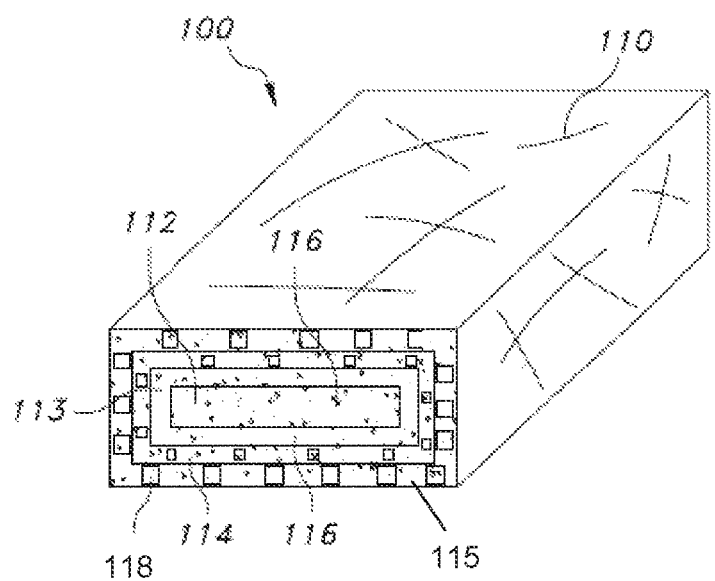
FIG. 3 illustrates a cross section of an oriented strand board according to FIG. 2A.

In a further embodiment, such as generally shown in FIG. 3, which also displays a cross section of an OSB such as shown in FIG. 2A, the OSB may have more than one inner layer 112 and 113 and/or more than one outer layer 114 and 15. However, it should be understood that the OSB may also include orientations where there is only one inner layer and two or more outer layers, or only one outer layer and two or more inner layers. Regardless, as shown in FIG. 3, in some embodiments, the inner layers 113 may contain a higher concentration of the water-soluble flame-retardant 116 than inner layer 112. In an alternative embodiment, both inner layers 112 and 113 may have generally the same amount and distribution of the water-soluble flame-retardant. Nonetheless, as shown in FIG. 3, the inner layers may have a gradient, with the amount by weight of water-soluble flame-retardant 116 used in the OSB increasing in concentration towards the exterior of the OSB.

Regardless of whether the inner layer(s) has one or both flame-retardants or whether the inner layer is formed from one or more layers, in some embodiments, the outer layer may include both the water-soluble flame-retardant 116 and the flame-retardant powder 118. In such a manner, the surface layer, which may directly contact a flame, contains both parts of the two-part flame-retardant.

Similarly, as described for the inner layers in FIG. 3, and referring again to FIG. 3, the outer layer 114 may contain only a small amount by weight of the flame-retardant powder, and a similar amount of the water-soluble flame-retardant as compared to outer layer 115 which has a higher amount by weight of the flame-retardant powder 118. In such a manner, the gradient that began in the inner layers may be continued by the flame-retardant powder 118 in the outer layer(s) 114/115. In some embodiments, the amount of the water-soluble flame-retardant 116 may be the same or similar in all inner layers 112/113, and the water-soluble flame-retardant 116 and flame-retardant powder 118 may be included in the same or similar amounts in all outer layers 114/115.

In some embodiments where the inner layer or core layer contains the water-soluble flame-retardant, the inner layer or core layer may contain the water-soluble flame-retardant in an amount from about 1 to about 10 wt. % of the inner layer(s), such as from about 2 to about 9 wt. %, such as from about 3 to about 8 wt. %, or any ranges or values there between, of the inner layer(s). Of course, it should be understood that if more than one inner layer is used, both layers individually may have the same or differing amounts of the water-soluble flame-retardant within the above recited ranges and may also have an average across all inner layers within the above recited ranges.

In some embodiments where the outer layer contains both the water-soluble flame-retardant and the flame-retardant powder, the outer layer may contain both the water-soluble flame-retardant and the flame-retardant powder in an amount of from about 1 to about 40 wt. % of the outer layer(s), such as from about 2 to about 35 wt. %, such as from about such as from about 3 to about 30 wt. %, such as about 4 to about 25 wt. %, such as from about 5 to about 20 wt. %, such as from about 6 to about 18 wt. %, such as from about 7 to about 17 wt. %, or any ranges of values there between, of the outer layer(s). Additionally, similar to the inner layer(s), it should be understood that if more than one outer layer is used, both layers individually may have the same or differing amounts of total flame-retardant compounds within the above recited ranges and may also have an average across all outer layers within the above recited ranges.

Additionally or alternatively, in some embodiments the outer layer may contain the water-soluble flame-retardant in an amount of from about 1 to about 20 wt. % of the outer layer(s), such as from about 2 to about 18 wt. %, such as from about 3 to about 15 wt. %, or any ranges or values there between, of the outer layer(s). Additionally, as discussed, it should be understood that if more than one outer layer is used, both layers individually may have the same or differing amounts of total flame-retardant within the above recited ranges and may also have an average across all outer layers within the above recited ranges.

Similarly, in some embodiments, the outer layer may contain the flame-retardant powder in an amount of from about 1 to about 20 wt. % of the outer layer(s), such as from about 2 to about 18 wt. %, such as from about 3 to about 15 wt. %, such as from about 4 to about 12 wt. %, such as from about 5 to about 10 wt. %, or any ranges or values there between, of the outer layer(s). Additionally, it should be understood that if more than one outer layer is used, both layers individually may have the same or differing amounts of total two-part flame-retardant within the above recited ranges and may also have an average across all outer layers within the above recited ranges.

Furthermore, in an embodiment where the inner layer or core layer contains the water-soluble flame-retardant, and the outer layer or surface contains both the water-soluble flame-retardant and the flame-retardant powder, the oriented strand board may have a total amount of the water-soluble flame-retardant and the flame-retardant powder of from about 1 to about 30 wt. % of the OSB, such as from about 2 to about 27.5 wt. %, such as from about 3 to about 25 wt. %, such as from about 4 to about 22.5 wt. %, such as from about 5 to about 20 wt. %, such as from about 6 to about 18 wt. %, or any values or ranges there between, of the oriented strand board.

Regardless of the orientation selected, the present disclosure has found that the combination of the water-soluble two-part flame-retardant and the flame-retardant powder compound unexpectedly exhibits synergistic improvement while exhibiting excellent mechanical properties. For instance, when measured using the Schlyter test as described herein, OSB according to the present disclosure may exhibit a flame spread in centimeters (cm)*minutes of about 210 cm*minutes or less, such as about 200 cm*minutes or less, such as about 190 cm*minutes or less, such as about 180 cm*minutes or less, such as about 170 cm*minutes or less, such as about 160 cm*minutes or less, such as about 150 cm*minutes or less, such as about 140 cm*minutes or less, such as about 130 cm*minutes or less, such as about 125 cm*minutes or less, such as about 115 cm*minutes or less, such as about 105 cm*minutes or less, such as about 95 cm*minutes or less, such as about 90 cm*minutes or less, or any ranges or values there between. Preferably, the flame-retardant oriented strand board exhibits an integrated flame height in cm*minutes of about 200 cm or less after 30 minutes.

Similarly, an OSB according to the present disclosure may exhibit an internal bond strength of about 50 psi or greater, such as about 60 psi or greater, such as about 70 psi or greater, such as about 80 psi or greater, such as about 90 psi or greater, such as about 95 psi or greater, such as about 225 psi or less, such as about 200 psi or less, such as about 175 psi or less, such as about 150 psi or less, such as about 125 psi or less, or any ranges or values there between. Preferably, the oriented strand board has an internal bond strength of about 50 psi or greater.

Furthermore, an OSB according to the present disclosure may have a modulus of elasticity of about 350,000 psi or greater, such as about 400,000 psi or greater, such as about 450,000 psi or greater, such as about 500,000 psi or greater, such as about 550,000 psi or greater, such as about 600,000 psi or greater, such as about 650,000 psi or greater, such about 750,000 psi or less, such as about 725,000 psi or less, such as about 700,000 psi or less, such as about 675,000 psi or less, or any values or ranges there between.

Moreover, an OSB according to the present disclosure may have a modulus of rupture of about 1,750 psi or greater, such as about 2,000 psi or greater, such as about 2,250 psi or greater, such as about 2,500 or greater, such as about 4,250 psi or less, such as about 4,000 psi or less, or any ranges or values there between.

In one embodiment, the two-part flame-retardant for oriented strand board comprises a water-soluble flame-retardant and a flame-retardant powder, wherein the water water-soluble flame-retardant comprised in the two-part flame-retardant of the invention may be at least one of
- a borate,
- a borate ester,
- a borate alkanolamine, preferably a boric acid and aminoethanol adduct, more preferably a 2-aminoethanol and boric acid adduct, most preferably a 2:1 wt. % adduct of 2-aminoethanol and boric acid,
- an amine phosphoric acid salt, preferably a polyamine phosphoric acid salt, more preferably a polyethylene amine phosphoric acid salt, or a dicyandiamide-formaldehyde phosphoric acid salt and wherein the flame-retardant powder may be at least one of
- a boric acid,
- a borate, such as borax, or disodium octaborate tetrahydrate (DOT),
- a phosphorous-nitrogen based powder, for example an amine-phosphate flame-retardant or a polyamine-phosphate flame-retardant, ammonium polyphosphate, guanidine phosphate,
- an adduct of a phosphoric acid and guanidine derivative such as guanylurea phosphate (GUP),
- a silicate, or
- combinations, derivatives, or adducts thereof.

In one embodiment, the two-part flame-retardant for oriented strand board comprises a water-soluble flame-retardant and a flame-retardant powder, wherein the water water-soluble flame-retardant is selected from the group comprising
- a borate,
- a borate ester,
- a borate alkanolamine, preferably a boric acid and aminoethanol adduct, more preferably a 2-aminoethanol and boric acid adduct, most preferably a 2:1 wt. % adduct of 2-aminoethanol and boric acid,
- an amine phosphoric acid salt, preferably a polyamine phosphoric acid salt, more preferably a polyethylene amine phosphoric acid salt, or a dicyandiamide-formaldehyde phosphoric acid salt and wherein the flame-retardant powder is selected from the group comprising
- a boric acid,
- a borate, such as borax, or disodium octaborate tetrahydrate (DOT),
- a phosphorous-nitrogen based powder, for example an amine-phosphate flame-retardant or a polyamine-phosphate flame-retardant, ammonium polyphosphate, guanidine phosphate,
- an adduct of a phosphoric acid and guanidine derivative such as guanylurea phosphate (GUP),
- a silicate, or
- combinations, derivatives, or adducts thereof.

In one embodiment, the two-part flame-retardant for oriented strand board comprises a water-soluble flame-retardant and a flame-retardant powder, wherein the water water-soluble flame-retardant is selected from the group comprising
- a borate,
- a borate ester,
- a borate alkanolamine, preferably a boric acid and aminoethanol adduct, more preferably a 2-aminoethanol and boric acid adduct, most preferably a 2:1 wt. % adduct of 2-aminoethanol and boric acid,
- an amine phosphoric acid salt, preferably a polyamine phosphoric acid salt, more preferably a polyethylene amine phosphoric acid salt, or a dicyandiamide-formaldehyde phosphoric acid salt and wherein the flame-retardant powder is selected from the group comprising
- a boric acid,
- a borate, such as borax, or disodium octaborate tetrahydrate (DOT),
- a phosphorous-nitrogen based powder, for example an amine-phosphate flame-retardant or a polyamine-phosphate flame-retardant,
- ammonium polyphosphate,
- guanidine phosphate,
- an adduct of a phosphoric acid and guanidine derivative such as guanylurea phosphate (GUP),
- a silicate, or
- combinations, derivatives, or adducts thereof, and wherein the water-soluble flame-retardant has a solubility in water of at least about 400 g/L.

In one embodiment the two-part flame-retardant for oriented strand board comprises a water-soluble flame-retardant and a flame-retardant powder, wherein the water water-soluble flame-retardant is selected from the group comprising of a boric acid and aminoethanol adduct, a polyethylene amine phosphoric acid salt, and combinations thereof, and wherein the flame-retardant powder is selected from the group comprising an ammonium polyphosphate (APP), an guanylurea phosphate or combinations thereof.

In one embodiment the two-part flame-retardant for oriented strand board comprises a water-soluble flame-retardant and a flame-retardant powder, wherein the water water-soluble flame-retardant is selected from the group comprising of a boric acid and aminoethanol adduct, a polyethylene amine phosphoric acid salt, and combinations thereof, and wherein the flame-retardant powder is selected from the group comprising an ammonium polyphosphate (APP), an guanylurea phosphate or combinations thereof, and wherein the water-soluble flame-retardant has a solubility in water of at least about 400 g/L.

In one embodiment, the two-part flame-retardant for oriented strand board comprises a water-soluble flame-retardant and a flame-retardant powder, wherein the water water-soluble flame-retardant a polyethylene amine phosphoric acid salt, and wherein the flame-retardant powder is an ammonium polyphosphate (APP).

In another embodiment the two-part flame-retardant for oriented strand board comprises a water-soluble flame-retardant and a flame-retardant powder, wherein the water water-soluble flame-retardant a polyethylene amine phosphoric acid salt, and wherein the flame-retardant powder is an ammonium polyphosphate (APP) and wherein the water-soluble flame-retardant has a solubility in water of at least about 400 g/L.

Method of Forming a Flame-Retardant Oriented Strand Board

Herein provided is a method of forming an oriented strand board according to the present disclosure. The method comprises:

applying an aqueous solution comprising a water-soluble flame-retardant present in the aqueous solution in an amount of 40 wt. % or greater to a first furnish; and
applying a flame-retardant powder to the first furnish;
wherein the first furnish is configured to form an oriented strand board without an additional drying step.

In some embodiments, the method may further comprise a second furnish, wherein the first furnish forms at least one outer layer and the second furnish forms at least one inner layer. The second furnish may comprise a water-soluble flame-retardant of the invention.

An oriented strand board according to the present disclosure may be generally formed as described above with reference to FIG. 1.

During the blending of the furnish 110 with any desired additives 112, "the blending step", a two-part flame-retardant according to the present disclosure is incorporated into the blender. One or more blending steps may occur. One or more batches of furnish may be placed into a blender after debarking and stranding. However, in the present disclosure, a batch of core furnish may be processed separately from a batch of surface furnish. In some embodiments, when both the surface and core layers are treated with both the water-soluble flame-retardant and the flame-retardant powder, the core layers and surface layers may be processed in a single batch.

Typically, a batch of core layer furnish is placed into the blender. The core layer furnish may then be sprayed or otherwise coated in an aqueous solution containing the water-soluble flame-retardant. As described above, the aqueous solution may be a concentrated solution, and/or may contain the water-soluble flame-retardant in an amount greater than 40 wt. % of the aqueous solution, or any of the other amounts described above. As this is a core furnish, the slightly dampened furnish may be mixed with any desired adhesives, waxes, and additional additives, and then removed from the blender to be arranged for hot-pressing after combination with the surface layer. Of course, it should be understood that all or a portion of the core layer batch may remain in the blender for further surface layer processing, however, a second batch will be described herein for convenience. Additionally or alternatively, the core layer furnish may also be processed as will be described for the surface layers, such that the core layer contains both the water-soluble flame-retardant and the flame-retardant powder.

Thus, a second batch of surface furnish, which may be the same or different than the core layer furnish, may be placed into the blender. As with the core layer, the surface layer furnish may be sprayed or otherwise coated in an aqueous solution containing the water-soluble flame-retardant. However, the slightly dampened surface furnish is then mixed with the flame-retardant powder. After mixing the flame-retardant powder with the furnish, the furnish may be mixed with any desired adhesives, waxes, and additional additives, and then removed from the blender to be arranged for hot-pressing after combination with the core layer.

While the additives have been described as being introduced into the blender after the introduction and blending of the two-part flame-retardant, it should be understood that the additives may be included at the same time as one or more of the flame-retardants, prior to the introduction of one or more of the flame-retardants, and/or after the introduction of the two-part flame-retardant, as may generally be known in the art.

After forming the surface layer and the core layer, which may be the same or different, both the surface layer furnish and the core layer furnish may be formed into separate mat(s). Accordingly, in some embodiments, at least one of the first furnish and the second furnish is formed into a mat and pressed. The surface layer furnish mat may be located on at least one exterior facing side of the core furnish mat, such as at least two exterior sides, such as at least three exterior sides, such as at least four exterior sides, such as at least five exterior sides, or where the surface furnish mat(s) completely surround the mat(s) of core furnish. Thus, in some embodiments, a mat formed of the second furnish may be disposed between at least two mats formed of the first furnish. In some embodiments, the mat may be a roughly cubical or rectangular three-dimensional shape with six sides. However, the mat may be formed into any size or shape as is generally known in the art. Additionally or alternatively, only a single type of layer may be used (e.g., when the core strands are also treated with the flame-retardant powder). In that case, one or more layers may be used and may form all or a portion of the width and height of the OSB. Nonetheless, regardless of whether the furnish is core or surface furnish, the furnish may be arranged such that the furnish with the lowest amount by weight total two-part flame-retardant is located at the centermost part of the mat (in one of, or both, the height and width direction). The furnish with the highest amount by weight total two-part flame-retardant is located on one or more of the outermost sides of the OSB.

In some embodiments, the second furnish is a portion of the first furnish that is separated from the first furnish after the applying of the aqueous solution but prior to the applying of the flame-retardant powder.

Regardless of the number and type of the layers, after the mats have been formed and placed, the treated furnish may be compressed under pressure and temperature as is known in the art to form the oriented strand boards.

Further provided is a kit comprising a two-part flame-retardant of the invention, wherein the water-soluble flame-retardant is in the form of an aqueous solution comprising at least about 40 wt. % of the water-soluble flame-retardant dissolved therein; and wherein the flame-retardant powder is in the form of a solid and has a median particle size (d50) of from about 1 µm to about 1000 µm.

Further provided is the use of a two-part flame-retardant of the invention for producing a flame-retardant oriented strand board of the invention as defined herein above.

Furthermore, certain embodiments of the present disclosure may be better understood according to the following examples, which are intended to be non-limiting and exemplary in nature.

Test Methods and Procedures:
Fire Performance Evaluation

Schlyter test: a modified Schlyter test was conducted to evaluate fire performance. The Schlyter test is described by "Fire Test Methods used in Research at the Forest Products Lab", Forest Products Lab Report 1443 (1959), US Department of Agriculture Forest Service. The modification of the methods was that two 30.5 cm×30.5 cm panels are used instead of the 30.5 cm×78.75 cm wood panels. The panels are aligned approximately 5 cm apart in a parallel fashion near the bottom of the apparatus immediately adjacent to the gas burner. The gas pressure was regulated to approximately 20 psi, providing a heat from the burner of about 1228 btu/hour. The remaining empty spaces in the Schlyter frame were filled with non-combustible cement board to minimize heat loss and maintain the vertical air flow. The test was conducted for 30 minutes with the panels continuously exposed to the flame. The height of the flame (h) was recorded every 30 seconds (Δt) and the Integrated Flame Height (IFH), a measure of flame spread, was calculated using the formula $$IFH = cm \ast min = \Sigma h_i \ast \Delta t_i.$$

Extended Duration Surface Burning Characteristics

Extended Duration Surface Burning Characteristics of Building Materials was tested according to ASTM E2768 (30 minute Tunnel Test) (2019). This test uses the apparatus and procedure of Test Method ASTM E84 with the total test period extended to 30 minutes. The OSB samples were tested by placing the OSB samples in a rectangular tunnel that is 45 cm in width by 30.5 cm in height and 762 cm long, with two gas burners at one end that direct a flame onto the surface of the material under controlled airflow. Distance of the flame travel and the rate at which the flame front advances during the 30-minute exposure determine the calculated flame spread index (FSI).

Internal Bond Strength

The internal bond strength of the OSB was measured according to ASTM D1037. The top and bottom surface layer of the OSB are bonded to two metal blocks with a hot melt adhesive. Then the two blocks are pulled by a testing machine to find the maximum load that can break the specimen. Internal bond strength=maximum load/area of specimen. The internal bond strength can be regarded as "cohesion of the panel in the direction perpendicular to the plane of the panel."

Abbreviations Used Throughout the Examples

GUP: guanylurea phosphate
APP: ammonium polyphosphate (CAS: 68333-19-9)
PMDI: polymeric methylene diisocyanate
DOT: disodium octaborate tetrahydrate ($Na_2B_8O_{13} \cdot 4H_2O$)
MFF: Maximum Flame Front (MFF)
FSI: Flame Spread Index
FR: flame-retardant

TABLE 1 abbreviations and concentrations related to examples

| Sample | wt. % flame-retardant solids |
| --- | --- |
| polyethylene amine phosphate | 48 |
| borate ester | 82 |
| 1:1 boric acid:borax | 100 |
| 1:1 boric acid:DOT[+] | 100 |
| GUP* | 100 |
| APP[$] | 100 |

*guanylurea phosphate
[$]ammonium polyphosphate (CAS: 68333-19-9)
[+]octaborate tetrahydrate ($Na_2B_8O_{13} \cdot 4H_2O$)

Borate Ester Used as the Water-Soluble Flame-Retardant in the Examples

The borate ester used as the water-soluble flame-retardant throughout the examples is a 2:1 wt. % adduct of boric acid and 2-aminoethanol.

Preparation of Polyethylene Amine Phosphate

The polyethylene amine phosphate used as the flame-retardant powder in all Examples was prepared by blending together 3,287 grams of water and 1,686 grams of a mixture of tetraethylenepentamine (TEPA), pentaethylenehexamine (PEHA), hexaethyleneheptamine (HEHA), and higher molecular weight polyethylene amine products, one example of which may be available as Polyamine B, (for example as sold by Akzo Nobel, CAS 68131-73-7) in a 10 liter mixing vessel. 2,597 grams of 75% phosphoric acid was slowly added while cooling the vessel and mixing, over the course of two hours. The resulting liquid, which had a viscosity of ~70 mPa*s, had approximately 48 wt. % flame-retardant and a pH of 6.2.

General Description for the Manufacturing Procedure of Engineered Wood Products

General Procedure for Treatment of Engineered Wood Products with Fire-Retardant

Procedure for Core Layer: Step 1

Procedure for Surface Layer: Step 1 and Step 2

In step 1 the dry strands (moisture content 2-5%) are sprayed with a concentrated aqueous solution of a flame-retardant. The amount of FR solution sprayed onto the strands is between 4 and 15%, such that the amount of water introduced onto the dry stands does not exceed about 7% by weight. By minimizing the furnish moisture content to below ~9%, it is possible to hot-press the formed strand mat without re-drying. On the other hand, if moisture content exceeds about 9%, stream pressure can build in the panel during hot pressing and the resin will not bind sufficiently to the wood, resulting in voids and de-lamination in the panel. After a short mixing time, a majority of the flame-retardant solution is absorbed into the interior of strands, leaving a lightly dampened surface. Strands from this step are suitable for use as a core layer.

In step 2 the moistened strands from step 1 are blended with a flame-retardant powder. The strands are uniformly dusted and the residual dampness on the strands from Step 1 ensures that the powder adheres to the strands.

After step 1 (for the core layer) and Steps 1 and 2 (for the outer layer), a liquid adhesive resin, and optional 1-2% emulsion wax release agent are sprayed onto the strands and uniformly blended. Afterwards the treated strands are formed into a mat so as to create a gradient, whereby strands treated with water-soluble flame-retardant (equipped with a lower level of fire-retardant) form the core layer, while strands treated with water-soluble flame-retardant and flame-retardant powder (higher overall fire-retardant concentration) form the outer layers. Finally, the mat is conveyed to a press whereby the wood particles are compressed with sufficient pressure and temperature to cure the bonding resin to form a composite wood product.

Example 1

Southern pine furnish with a moisture content of 4% was screened to remove fines and placed into a drum blender. Flame-retardants were incorporated into the core layer, the surface layer, or both, as shown in Table 2 below. The furnish was then blended with 3 wt. % of a PMDI (polymeric methylene diisocyanate) resin and 1.5% of a wax emulsion. Forming boxes were used to form mats having three layers, one core layer between two surface layers. The mats were pressed at a platen temperature of 204° C. with a pressing cycle of 360 seconds and press closure rate of 20 seconds. After pressing, the panels were cooled for two days. After two days, the panels were cut into 30.5 cm×30.5 cm sections and allowed to equilibrate under ambient conditions until a moisture content of approximately 10% was achieved.

| Furnish | southern pine |
| --- | --- |
| Moisture content | 4% |
| Blend | 3 wt. % of a PMDI (polymeric methylene diisocyanate) resin and 1.5% of a wax emulsion |
| Pressed | 204° C., 360 seconds |
| Panels | 30.5 cm × 30.5 cm |
| Final moisture content | 10% |

As seen in Table 2, the treated samples all exhibited far better flame spread than the untreated sample and commercial OSB.

Example 2

A core layer formed according to the method of Example 1 was treated with an aqueous water-soluble flame-retardant of polyethylene amine phosphate or borate ester, in an amount equal to 4.8% of active dry solids, except that a press temperature of 213° C. and press time of 160 seconds was used. A surface layer was treated with an identical amount of the water-soluble flame-retardant (4.8% active solids) plus an additional 5.4% of a powder flame-retardant compound of a 1:1 blend of boric Acid and Borax, or a 1:1 blend of boric acid and disodium octaborate tetrahydrate ($Na_2B_8O_{13} \cdot 4H_2O$, DOT), or guanylurea phosphate (GUP)—see Table 3. The total flame-retardant loading in the surface layers was maintained at 10.2 wt. %, while the overall total percentage of flame-retardant across all layers was 7.5 wt. %.

| Furnish | southern pine |
| --- | --- |
| Moisture content | 4% |
| Blend | 3 wt. % of a PMDI (polymeric methylene diisocyanate) resin and 1.5% of a wax emulsion |
| Pressed | 213° C., 160 seconds |
| Panels | 30.5 cm × 30.5 cm |
| Final moisture content | 10% |

TABLE 2

Amount of flame-retardant in core layer and surface layer and results for example 1.

| | Core layer | | Surface layer | | | | | | |
| --- | --- | --- | --- | --- | --- | --- | --- | --- | --- |
| Sample | polyethylene amine phosphate (wt. %) | borate ester (wt. %) | polyethylene amine phosphate (wt. %) | borate ester (wt. %) | 1:1 Boric acid:Borax (wt. %) | 1:1 Boric acid:DOT | GUP (wt. %) | Integrated Flame Height (cm * min) | Internal bond strength (psi) |
| control | 0 | 0 | 0 | 0 | 0 | 0 | 0 | 442 | 150 |
| Commercial OSB | 0 | 0 | 0 | 0 | 0 | 0 | 0 | 429 | |
| 1 | | 4.8 | | 4.8 | | | | 203 | |
| 2 | | 4.8 | | 4.8 | 5.4 | | | 208 | |
| 3 | | 4.8 | | 7.2 | | 8.1 | | 193 | |
| 4 | | 4.8 | | 4.8 | | | 5.4 | 79 | |
| 5 | 4.8 | | 4.8 | | | | | 160 | 145 |
| 6 | 4.8 | | 4.8 | | 5.4 | | | 168 | |
| 7 | 4.8 | | 7.2 | | | 8.1 | | 203 | |
| 8 | 4.8 | | 4.8 | | | | 5.4 | 79 | 130 |

TABLE 3

Amount of flame-retardant in core layer and surface layer and results for example 2.

| | Core Layer | | Surface layer | | | | | | |
|---|---|---|---|---|---|---|---|---|---|
| Sample | polyethylene amine phosphate (wt. %) | borate ester (wt. %) | polyethylene amine phosphate (wt. %) | borate ester (wt. %) | 1:1 Boric acid:Borax (wt. %) | 1:1 Boric acid:DOT | GUP (wt. %) | Integrated Flame Height (cm * min) | Internal bond strength (psi) |
| 11 | 4.8 | | 4.8 | | | 5.4 | | 168 | |
| 12 | 4.8 | | 4.8 | | | | 5.4 | 79 | 130 |
| 13 | | 4.8 | | 4.8 | 5.4 | | | 208 | |
| 15 | | 4.8 | | 4.8 | | | 5.4 | 79 | |

As shown in Tab. 3 samples formed to include polyethylene amine phosphate and polyethylene amine phosphate+ GUP exhibited internal bond strength only slightly decreased from the control, and the internal bond strength for both samples is well above the minimum requirement of 50 psi (3447 mbar).

Example 3

A Core layer formed according to the method described in example 1 except that Aspen furnish was used and pressed at a temperature of 210° C. for 170 seconds. The core layer was treated with a water-soluble flame-retardant compound of polyethylene amine phosphate or borate ester, in an amount equal to 4.8% of active dry solids. However, the surface layer was treated with varying amounts of flame-retardant compounds according to Table 4.

TABLE 4

Amount of flame-retardant in core layer and surface layer and results for example 3

| | Core layer | | Surface layer | | | | |
|---|---|---|---|---|---|---|---|
| Sample | polyethylene amine phosphate (wt. %) | borate ester (wt. %) | polyethylene amine phosphate (wt. %) | borate ester (wt. %) | 1:1 Boric acid:Borax (wt. %) | 1:1 Boric acid:DOT (wt. %) | Internal bond strength (psi) |
| control | 0 | 0 | 0 | 0 | 0 | 0 | 107 |
| 16 | 4.8 | | 4.8 | | | 5.4 | 92 |
| 19 | 4.8 | | 7.2 | | | 5.4 | 107 |
| 21 | | 4.8 | | 4.8 | | 5.4 | 92 |
| 23 | | 4.8 | | 7.2 | | 5.4 | 70 |

As shown in Tab. 4 samples 16, 19, 21, and 23 all exhibited excellent internal bond strength well above the minimum threshold of 50 psi (3447 mbar), and exhibited only a slightly decreased internal bond strength as compared to the control.

Example 4

A core layer formed according to the method described in example 1 except that that a press temperature of 213° C. and a press time of 160 seconds was used. The core layer was treated with a water-soluble flame-retardant compound of polyethylene amine phosphate then borate ester, followed by one of guanylurea phosphate or ammonium phosphate, in varying amounts as shown in Table 5.

TABLE 5

Amount of flame-retardant in core layer and surface layer and results for example 4

| | Core layer | | Surface layer | | | | |
|---|---|---|---|---|---|---|---|
| Sample | polyethylene amine phosphate (wt. %) | borate ester (wt. %) | polyethylene amine phosphate (wt. %) | borate ester (wt. %) | GUP (wt. %) | APP (wt. %) | Internal bond strength (psi) |
| control | 0 | 0 | 0 | 0 | 0 | 0 | 107 |
| 28 | 4.8 | | 7.2 | | 7.2 | | 116 |
| 29 | 4.8 | | 7.2 | | | 7.2 | 75 |
| 33 | | 4.8 | 7.2 | | 7.2 | | 96 |
| 34 | | 4.8 | 7.2 | | | 7.2 | 66 |

As shown in Tab. 5 samples 28, 29, 33, and 34 all exhibited internal bond strength above the threshold of 50 psi.

Example 5

Southern Yellow Pine strands were dried to a moisture content of 4%. Strands for the core and surface layers were treated separately in a large rotary blender. The order of chemical addition was as follows: the water-soluble flame-retardant was sprayed first, followed by addition of powder flame-retardant, then PMDI resin (4%) and finally wax emulsion (1%).

A total of 33 kg of strands was used for each panel, which represented the combined total of strands forming the respective core and surface layers. The strands were layered in a forming box measuring 256.5 cm×104.1 cm, which was located on top of a metal caul plate. After the strand mat was formed, the forming box was removed, a metal screen was placed on top of the mat, and the assembly was placed in a large hydraulic press. The mat was pressed to the target thickness using an initial pressure of 750 psi (51.7 bar), a temperature of 210° C. and a total press cycle time of 4-5 minutes. The use of metal shims aided in controlling panel height (thickness). After cooling, the OSB panels were trimmed to their final dimensions and conditioned, in preparation for tunnel testing. All panels were tested on the smooth side, i.e. the side that was in contact with the metal caul plate. Table 6a and 6b show the results of the ASTM E2768 tunnel test.

Amount of FR in wt. % refers to the weight fraction of treated strands used in the core or surface layers. For example, if FR 50 wt. % for the core, and FR 25 wt. % for the surface layer, in this case where there are two surface layers each having 25% of the treated strands, the total surface layer has 50 wt. % FR. All percentages are percentages by weight of the OSB.

TABLE 6b

Results of the ASTM-E2768-11 tunnel test and ASTM D1037 test for example 5

| Sample | FSI | MFF (cm) | MFF (ft) | Ignition time (sec.) | Total FR (wt. %) | Internal bond strength (psi) |
|---|---|---|---|---|---|---|
| control | >100 | na | na | na | 0 | 107 |
| 40 | 40 | 518 | 17.0 | 43 | 9.9 | |
| 41 | 50 | 732 | 24.0 | 51 | 9.9 | |
| 42 | 20 | 488 | 16.0 | 50 | 13.8 | |
| 43 | 5 | 308 | 10.1 | 59 | 16.8 | 100 |
| 44 | 25 | 549 | 18.0 | 45 | 15 | |
| 45 | 25 | 427 | 14.0 | 48 | 20 | |
| 46 | 20 | 317 | 10.4 | 44 | 14.2 | 120 |
| control | >100 | na | na | na | 0 | 125 |

As shown in Table 6a and 6b, it may be seen that the combination of water-soluble and powder flame-retardants, together with the use of a gradient approach (e.g., samples 40, 41, 42 and 43 in Table 6a and 6b) exhibited a marked improvement in reducing the Flame Spread Index (FSI), TABLE 6a Amount of flame-retardant in core layer and surface layer and results for example 5

| | Core layer | | Surface layer | | | | |
|---|---|---|---|---|---|---|---|
| Sample | polyethylene amine phosphate (wt. %) | amount FR-treated strands in wt % | polyethylene amine phosphate (wt. %) | APP (wt %) | GUP (wt %) | amount FR-treated strand in wt % | panel thickness (cm) |
| control | 0 | 0 | 0 | 0 | 0 | 0 | 1.6 |
| 40 | 4.8 | 50 | 7.5 | 7.5 | | 25 | 1.6 |
| 41 | 4.8 | 50 | 7.5 | | 7.5 | 25 | 1.6 |
| 42 | 6.8 | 70 | 20 | 10 | | 15 | 1.6 |
| 43 | 6.8 | 70 | 20 | 20 | | 15 | 1.6 |
| 44 | 15 | 50 | 15 | | | 25 | 1.6 |
| 45 | 20 | 50 | 20 | | | 25 | 1.6 |
| 46 | 3.4 | 50 | 15 | 10 | | 25 | 1.12 |
| control | 0 | 0 | 0 | 0 | 0 | 0 | 1.12 |

Maximum Flame Front (MFF) and Ignition time according to ASTM E84 or E2768 procedures defined above. In particular, sample 43 which contained only 16.8% total two-part flame-retardant, was able to achieve a Class A fire rating (FSI<25, MFF<320 cm).

The invention claimed is:

1. A method of forming a flame-retardant oriented strand board, the method comprising,
applying an aqueous solution comprising a solvent comprising water and a water-soluble flame-retardant having a solubility in water of at least about 400 g/L that is not water present in the aqueous solution in an amount of about 40% by weight or greater to a first furnish; and
applying a flame-retardant powder to the first furnish;
wherein the first furnish is configured to form an oriented strand board without an additional drying step;
wherein the oriented strand board comprises at least one inner layer and at least one outer layer, and wherein said layers are subjected to compression employing at least one adhesive to form the oriented strand board.

2. The method of claim 1, optionally further comprising applying the water-soluble flame-retardant to a second furnish, wherein the first furnish forms the at least one outer layer and the second furnish forms at least one inner layer.

3. The method of claim 2, wherein at least one of the first furnish and the second furnish is formed into a mat and pressed.

4. The method of claim 3, wherein the second furnish is a portion of the first furnish that is separated from the first furnish after applying the aqueous solution but prior to applying of flame-retardant powder.

5. The method of claim 1, wherein the water-soluble flame-retardant comprises
a borate,
a borate ester,
a borate alkanolamine,
an amine phosphoric acid salt,
a dicyandiamide-formaldehyde phosphoric acid salt, or combinations thereof.

6. The method of claim 1, wherein the water-soluble flame-retardant is selected from the group consisting of
a borate alkanolamine,
an amine phosphoric acid salt,
a dicyandiamide-formaldehyde phosphoric acid salt, and combinations thereof.

7. The method of claim 1, wherein the water-soluble flame-retardant is selected from the group consisting of
a borate alkanolamine, which is a boric acid and aminoethanol adduct,
an amine phosphoric acid salt, which is a polyethylene amine phosphoric acid salt, or
a dicyandiamide-formaldehyde phosphoric acid salt, and combinations thereof.

8. The method of claim 7, wherein the boric acid and aminoethanol
adduct is a 2-aminoethanol and boric acid adduct, and/or the polyethylene amine phosphoric acid salt is a reaction product of tetraethylenepentamine (TEPA), pentaethylenehexamine (PEHA), hexaethyleneheptamine (HEHA), higher molecular weight polyethylene amine product such as Polyamine B, or mixtures thereof, with phosphoric acid.

9. The method of claim 1, wherein the flame-retardant powder has a median particle size (d50) of from about 1 μm to about 1000 μm.

10. The method of claim 1, wherein the flame-retardant powder comprises
a boric acid,
borax,
disodium octaborate tetrahydrate (DOT),
guanylurea phosphate (GUP),
an ammonium polyphosphate (APP), or combinations thereof.

11. The method of claim 10, wherein the flame-retardant powder comprises
a 1:1 blend of boric acid and borax, and/or
a 1:1 blend of boric acid and disodium octaborate tetrahydrate (DOT).

12. The method of claim 10, wherein the ammonium polyphosphate (APP) is ammonium polyphosphate phase 2.

* * * * *